No. 883,407. PATENTED MAR. 31, 1908.
G. W. JESSUP, JR.
STEAM GENERATOR.
APPLICATION FILED APR. 29, 1905.

4 SHEETS—SHEET 2.

WITNESSES:
W. H. Canby.
S. G. Doyle.

INVENTOR
George W. Jessup Jr.
BY
A. V. Groupy
ATTORNEY.

No. 883,407. PATENTED MAR. 31, 1908.
G. W. JESSUP, Jr.
STEAM GENERATOR.
APPLICATION FILED APR. 29, 1905.
4 SHEETS—SHEET 3.
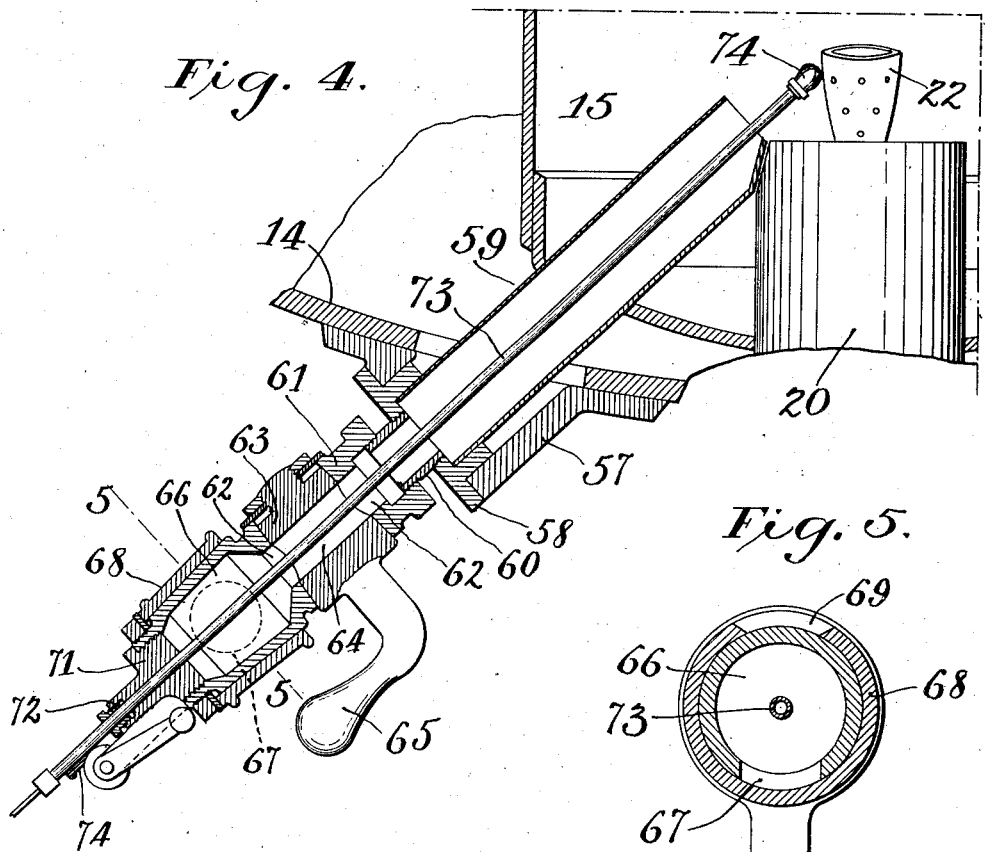
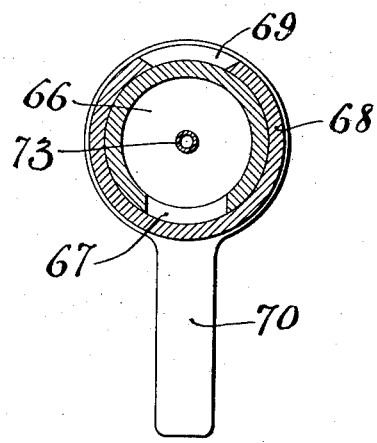
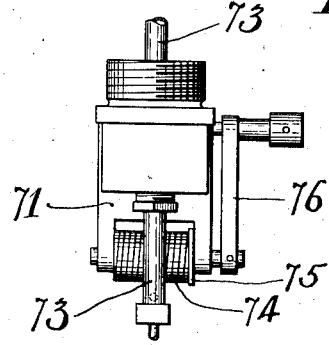
WITNESSES:
W. H. Canby
S. G. Doyle
INVENTOR
George W. Jessup Jr.
BY
A. V. Groupy
ATTORNEY.

No. 883,407. PATENTED MAR. 31, 1908.
G. W. JESSUP, Jr.
STEAM GENERATOR.
APPLICATION FILED APR. 29, 1905.
4 SHEETS—SHEET 4.
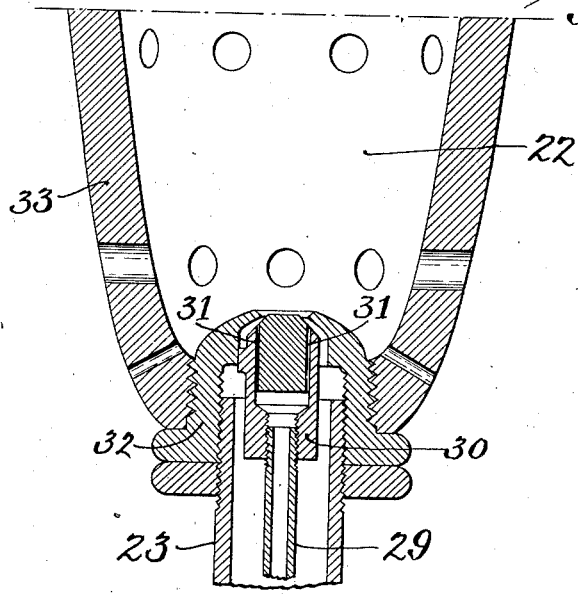
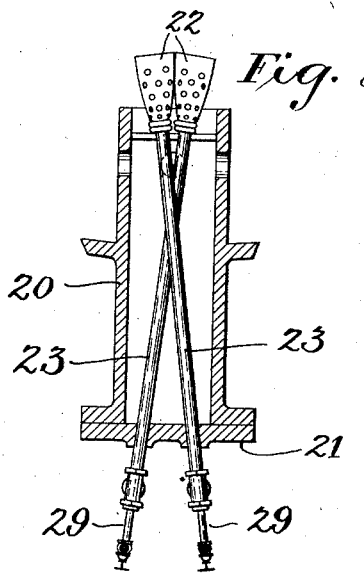
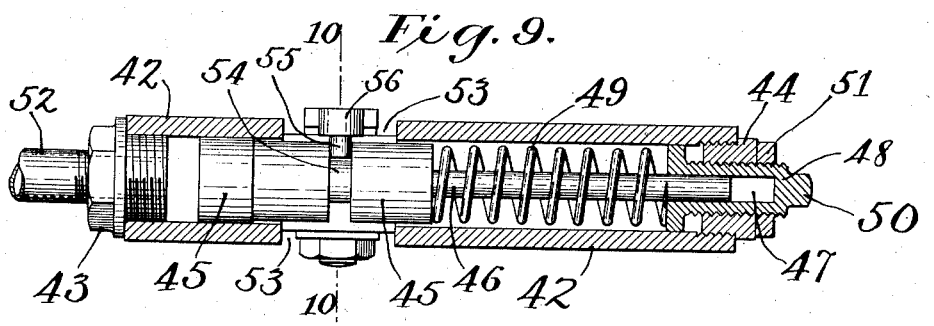
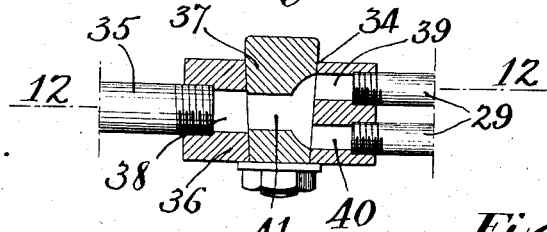
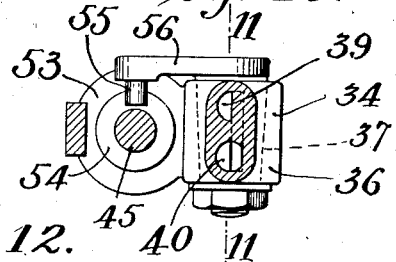
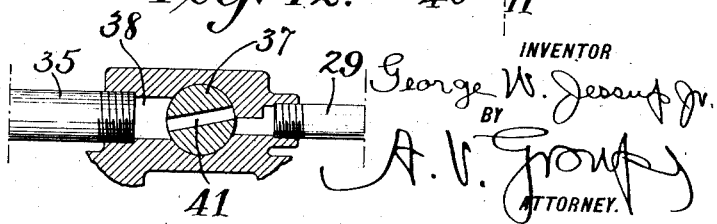

UNITED STATES PATENT OFFICE.

GEORGE W. JESSUP, JR., OF WALTHAM, MASSACHUSETTS.

STEAM-GENERATOR.

No. 883,407.	Specification of Letters Patent.	Patented March 31, 1908.

Application filed April 29, 1905. Serial No. 257,985.

*To all whom it may concern:*

Be it known that I, GEORGE W. JESSUP, Jr., a citizen of the United States, residing at Waltham, in the county of Middlesex and State of Massachusetts, have invented certain new and useful Improvements in Steam-Generators, of which the following is a specification.

This invention relates to that class of steam generators wherein the products of combustion from the fire pass through the water from which the steam is to be generated, my object being to provide, in this connection, a simple and efficient construction and organization of parts whereby a large percentage of heat units contained in a given quantity of fuel is caused to effect the generation of steam.

Having this object in view the invention consists in the novel construction and combinations of parts which will be hereinafter fully described and claimed.

Figure 1:
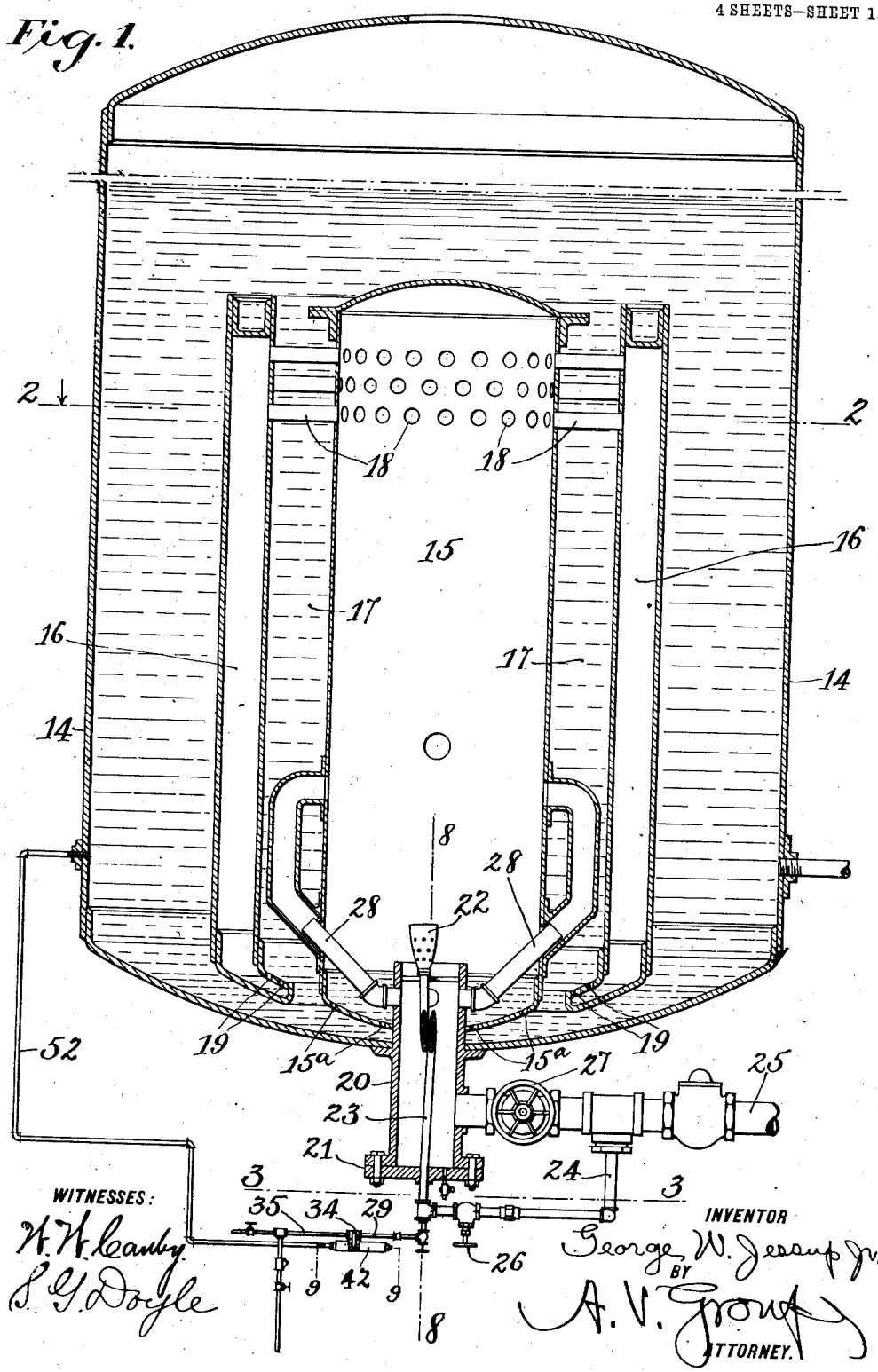
Figure 2:
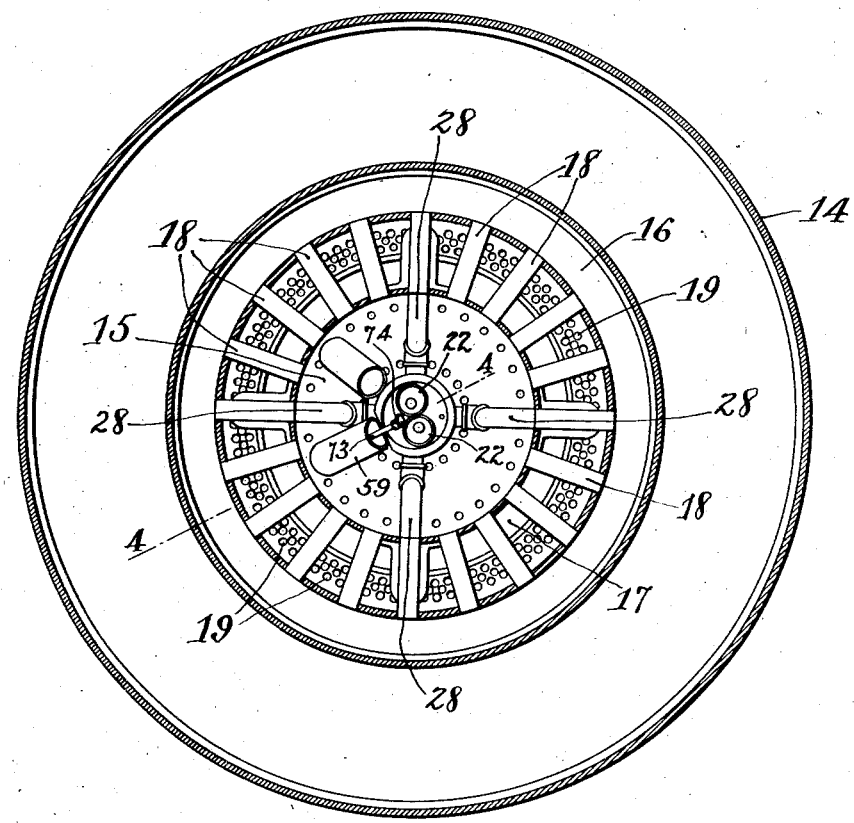
Figure 3:
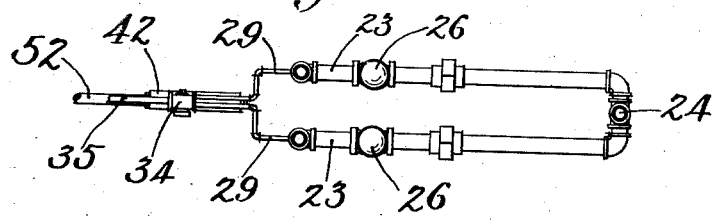

In the drawings:—Figure 1 is a sectional elevation of my improved steam generator. Fig. 2 is a sectional plan thereof, as on the line 2—2 of Fig. 1. Fig. 3 is a sectional plan, as on the line 3—3 of Fig. 1. Fig. 4 is a sectional detail, as on the line 4—4 of Fig. 2. Fig. 5 is a sectional detail, as on the line 5—5 of Fig. 4. Fig. 6 is a detail of the lower end of Fig. 4, as seen at right angles thereto. Fig. 7 is a sectional detail of one of the burners. Fig. 8 is a vertical section, as on the line 8—8 of Fig. 1. Fig. 9 is a section plan of a portion of the automatic regulating mechanism for the burners, as on the line 9—9 of Fig. 1. Fig. 10 is a sectional detail thereof, as on the line 10—10 of Fig. 9. Fig. 11 is a similar detail, as on the line 11—11 of Fig. 10. Fig. 12 is a similar detail, as on the line 12—12 of Fig. 11.

14 designates the boiler which, in the present embodiment of my invention, is cylindrical in form and vertically-arranged, as shown.

Arranged centrally within the lower portion of the boiler 14 is the combustion chamber 15 provided with opening 15ª in the bottom thereof to afford communication between the combustion chamber and the boiler. Surrounding the combustion chamber 15 is a casing providing an annular chamber 16 between the vertical walls of the casing, and providing also an annular space 17 between the combustion chamber 15 and the chamber 16. The upper end of the combustion chamber communicates with the upper end of the chamber 16 by a series of radially-arranged pipes 18 through which the products of combustion pass from the combustion chamber 15 into the annular chamber 16. The top of the chamber 16 is closed, excepting as to the pipes 18, and the bottom of the chamber 16 is turned inwardly beneath the annular space 17, as shown. The upper wall of the inwardly turned portion of the chamber 16 is provided with perforations 19 through which the products of combustion may escape from the chamber and be directed to pass up through the annular space 17.

Secured to the bottom of the boiler 14 is a large pipe or drum 20 which opens into the lower portion of the combustion chamber 15 and extends down below the bottom of the boiler, the lower end of the pipe or drum 20 being closed by a suitable head 21. Arranged at or near the upper open end of the pipe 20 is a pair of burners 22. Leading to the burners 22 and extending up through the head 21 and pipe 20 are air supply pipes 23 which are connected by a common pipe 24 to a larger pipe 25. This pipe 25 opens into the pipe or drum 20 and is connected to a suitable source of air supply, whereby air, under pressure, may be introduced to the burners 22 and pipe 24, suitable valves 26 and 27 being provided whereby the admission of air to the burners 22 and pipe 20, respectively, may be controlled. Leading from the upper portion of the pipe 20 are pipes 28 which communicate with other pipes opening into the combustion chamber 15, above the burners 22, for a purpose hereinafter explained.

Entering the air pipes 23 are the oil supply pipes 29, hereinafter referred to, which extend up through the air pipes 23 to the burners 22 and through which oil may be supplied to the burners under pressure.

Each burner 22, in the present instance, is of the following construction:—Screwed onto the top of the oil pipe 29 is a head 30 provided with a circular series of openings or channels 31 for the discharge of oil from the pipe 29. Surrounding this head 30 and screwed onto the air pipe 23 is a cap 32 between which and the head 30 spaces are provided for the passage of the air. The top of the cap 32 is provided with a central opening and it extends over the oil channels 31 but out of contact with the head 30. Extending upwardly from the cap 32 is a perforated cup-like chamber 33 open at its upper end and screwed onto the cap 32. The oil from the pipes 29 is mixed with the air from the pipes 23 and vaporized upon being discharged from the top of the caps 32 to the burners 22. The oil supply pipes 29 lead from a valve 34 to the burners 22, and leading to the valve 34 from a suitable source of oil supply, is a pipe 35, whereby oil may be introduced to the burners under pressure. The valve 34 comprises a casing 36 and a tapering plug 37 fitted thereto. The pipe 35 opens into a passageway 38 leading to the plug 37, and the pipes 29 open into passageways 39 and 40 also leading to the plug 37. The plug 37 is provided with a transverse opening 41 extending therethrough which is adapted to afford communication between the pipes 35 and 23. The passageways 38, 39 and 40 are so proportioned and disposed relatively to each other that by turning the plug 37 in one direction, communication may be established between the passageway 38 and both passageways 39 and 40, and by turning the plug 37 in the reverse direction communication between the passageway 38 and passageways 39 and 40 may be cut off, one in advance of the other. The valve casing 36 is made integral with or secured to a cylinder 42 provided with end heads 43 and 44. Fitted to this cylinder 42 is a piston 45 having a rod 46 extending into an opening 47 in a sleeve 48 which is externally screw-threaded and is screwed into the end head 44. Encircling the rod 46 and bearing against the piston 45 and a flange on the inner end of the sleeve 48 is a spring 49 which tends normally to force the piston 45 toward the end head 43. On the outer end of the sleeve 48 is a square head 50 by means of which the sleeve may be turned and thereby adjusted to regulate the pressure of the spring 49. The sleeve is provided with a suitable lock nut 51 adapted to take against the end head 44 to lock the sleeve in its position of adjustment. Screwed into the end head 43 is a pipe 52 having one of its ends opening into the boiler 15 and its other end opening into the cylinder 42 whereby the boiler pressure may enter the cylinder 42 to act upon and move the piston 45 in opposition to the spring 49. The cylinder 42 is cut away, as at 53, adjacent to the body of the piston 45, and the piston 45 is provided with a circumferential groove 54 within the cut away portion 53 of the cylinder. Entering this groove 54 is a depending pin 55 carried by an arm 56 which projects from the upper end of the valve plug 37, to the end that when the piston is moved back and forth, the plug 37 will be turned to open and close the valve 34.

By the construction just described, it will be seen that the steam pressure of the boiler 15 regulates the supply of oil to the burners, and consequently increases or decreases the heat delivered from the burners 22; that is to say, when the pressure of the boiler increases, the piston 45 will be forced thereby against the action of the spring 49 in a manner to turn the plug 37 to reduce the amount of oil passing to the burners, the oil being entirely cut off from one burner in advance of the other as previously explained; and, when the pressure of the boiler decreases, the piston will be forced by the spring 49 against the boiler pressure to gradually open the valve 34 and increase the quantity of oil being delivered to the burners. Therefore, a uniform steam pressure may be maintained within the boiler 14 by the automatic opening and closing of the valve 34 under the influence of the boiler pressure. By adjusting the sleeve 48 to increase or decrease the pressure of the spring 49 against the piston 45, any degree of steam pressure may be automatically maintained within the boiler.

As a suitable means whereby a flame may be introduced to the combustion chamber 15 to light the burners 22, I provide the following;—Secured to the bottom of the boiler 14 is a member 57 to which is fastened the flanged collar 58 of a cylindrical guard 59 which extends through the bottom of the boiler and bottom of the combustion chamber 15 to a point adjacent to the burners 22. Screwed into the collar 58 is a union 60 carrying a valve body 61 having an opening 62 extending therethrough in line with the union 60 and guard 59. Fitted to the valve body 61 is a tapering plug 63 having a transverse opening 64 therein, which opening is adapted to register with the opening 62, as shown, and form, in effect, a continuation thereof. When the plug 63 is turned to a position at right angles to that shown, the plug will close the opening 62. Projecting from the plug 63 is a suitable handle 65 by means of which it may be turned. Formed on the bottom of the valve body 61 is a chamber 66 communicating with the opening 62 and provided with a lateral opening 67 therein. Surrounding the chamber 66 and closely fitted thereto is a tapering collar 68 having a lateral opening 69 therein which, when the collar is turned is adapted to register with the opening 67 whereby access may be had to the chamber 66. The collar 68 is provided with a suitable handle 70 as a means whereby it may be turned. Screwed into the lower end of the chamber 66 is a head 71 having a stuffing box 72 through which extends an oil tube 73, the lower end of which is connected to a suitable source of oil supply whereby oil, under pressure, may be supplied to the tube. This tube 73 extends centrally through the chamber 66, the opening 62 and 64, the union 60 and the guard 59 to a point adjacent to the burners 22, and the upper end of the tube 73 carries a burner of asbestos 74 or similar material to receive the oil from the tube 73. When it is desired to light the burners 22, the tube 73 is drawn outwardly through the head 71 until the asbestos 74 occupies a position within the chambers 66. The valve plug 63 is then turned to close the opening 62 to cut off communication between the interior of the boiler and the open air, and the collar 68 turned to bring the opening 69 into register with the opening 67 to afford access to the burner 74 which is then lighted. This being done, the collar 68 is turned to close the opening 69, the plug 63 is turned to bring the opening 64 into register with the opening 62 and the tube is moved back to the position shown to cause the flame carried by the burner 74 to ignite the mixture of oil and air delivered to the burners 22.

In order to force the tube 73 back into the combustion chamber against the pressure therein, I provide a cord 74 one end of which is fastened to the outer end of the tube 73 and the other end of which is fastened to and wound around a suitable reel 75 journaled in the head 71 and provided with a suitable handle 76.

I claim:—

1. In a steam generator, a boiler, a combustion chamber therein, provided with openings in its lower portion to afford communication between said chamber and boiler, a burner within the combustion chamber and located above said openings, a fuel supply pipe leading to the burner and an air pipe communicating with the combustion chamber away from the burner.

2. In a steam generator, a boiler, a combustion chamber within the boiler, a second chamber within the boiler and communicating with the upper portion of the combustion chamber said chamber having its lower portion provided with openings communicating with the boiler, a burner within the combustion chamber, and a fuel supply pipe leading to the burner.

3. In a steam generator, a boiler, a combustion chamber within the boiler and having its lower portion opening into the boiler, a second chamber within the boiler and communicating with the upper portion of the combustion chamber said chamber having its lower portion provided with openings communicating with the boiler, a burner within the combustion chamber, and a fuel supply pipe leading to the burner.

4. In a steam generator, a boiler, a combustion chamber therein, a second chamber within the boiler and surrounding the combustion chamber, said second chamber having its upper portion communicating with the upper portion of the combustion chamber and its lower portion communicating with the boiler, a burner within the combustion chamber, and a fuel supply pipe leading to the burner.

5. In a steam generator, a boiler, a combustion chamber provided with openings in its lower portion to afford communication between said chamber and boiler therein and communicating therewith, a burner within the combustion chamber and located above said openings, a fuel supply pipe leading to the burner, and means under the control of the boiler pressure for automatically regulating the supply of fuel to the burner.

6. In a steam generator, a boiler, a combustion chamber therein and communicating therewith, a pair of burners within the combustion chamber, fuel supply pipes leading to the burners, and means under the control of the boiler pressure for automatically regulating the supply of fuel to said burners one in advance of the other.

7. In a steam generator, a boiler, a combustion chamber therein and communicating therewith a burner within the combustion chamber, a fuel supply pipe leading to said burner, a second burner movable into and out of the combustion chamber to light the first named burner, and means whereby access may be had to said second burner without disturbing the boiler pressure.

8. In a steam generator, a boiler, a combustion chamber therein and communicating therewith, a burner within the combustion chamber, a fuel supply pipe leading to said burner, a second burner movable into and out of the combustion chamber to light the first named burner, means whereby access may be had to said second burner without disturbing the boiler pressure, and means under the control of the boiler pressure for automatically regulating the supply of fuel to the first named burner.

9. In a steam generator, a boiler, a combustion chamber provided with openings to afford communication between said chamber and boiler therein and communicating therewith, a burner within the combustion chamber and located above said openings, an oil pipe leading to the burner, an air pipe leading to the burner, and an air pipe leading to the combustion chamber.

10. In a steam generator, a boiler, a combustion chamber therein and communicating therewith, a burner within the combustion chamber, a fuel supply pipe leading to the burner, and an air pipe leading to the combustion chamber and provided with branch passageways opening into the combustion chamber above the burner therein.

In testimony whereof I affix my signature in presence of two witnesses.

GEORGE W. JESSUP, JR.

Witnesses:
ERNEST R. WATERMAN,
BREWSTER C. SHETTER.